Patented Mar. 7, 1939

2,149,682

UNITED STATES PATENT OFFICE 2,149,682

PROCESS OF IMPROVING THE BAKING STRENGTH OF FLOUR

Holger Jørgensen, Copenhagen, Denmark, assignor, by mesne assignments, to N. V. Noury & van der Lande's Exploitatie Maatschappij, Deventer, Netherlands No Drawing. Application August 13, 1935, Serial No. 36,039. In Denmark March 29, 1935

4 Claims. (Cl. 99—90)

My invention relates to the improvement of the baking strength of flour or the production of a flour the baking strength of which has been improved, as compared with untreated flour, or ordinary flour. The invention also includes the production of a dough for bread-making which dough is equivalent to a dough produced by means of flour, the baking strength of which has been improved. Further my invention relates also to the flour, the baking strength of which has been improved by the method that constitutes one subject matter of my invention and to bread produced from such flour or from the dough the production of which constitutes one subject matter of my invention.

It has been known for many years that the baking strength of flour may often be considerably improved by the addition of small quantities of certain chemicals. Among these chemicals the oxydants play a prominent part. Thus ammonium persulphate, potassium bromate, sodium perborate and the like substances have particularly been proposed for that purpose (cf. for example British Patents Nos. 2778 of 1911 and 1685 of 1915 and German Patent No. 431,749).

Against the employment of these chemicals the improving influence of which on the baking strength is often very marked, objections have been raised from time to time on a hygienic base, the substances mentioned being considered outside the scope of what can be termed "normal physiological constituents of food".

Undoubtedly it would be important if a substance could be found constituting such a "normal physiological constituent of food" and possessing at the same time the property of influencing the baking strength of flour in a similarly favorable manner as the oxydants mentioned above.

One object of my present invention is to find such a substance adapted to improve the baking strength of flour by its mere presence in such flour and constituting at the same time a "normal physiological constituent of food".

Another object of my present invention consists in the method of producing flour the baking strength of which has been improved by adding to normal flour a suitable quantity of such a substance in such a manner as to intermix intimately the flour and the said substance. The term "normal flour" designates here and in the following specification and claims a flour to which no content of said substance has been added.

Still another object of my present invention consists in the method of producing a dough equivalent with the dough that can be produced by means of flour the baking strength of which has been improved according to my invention which method comprises imparting during the production of the dough from normal flour a suitable content of a substance having the properties described above and mixing this substance intimately with the other constituents of the dough.

A further object of my present invention consists in flour to which a suitable content of a substance, having the properties in question, has been imparted and a still further object of my invention consists in bread made by means of flour to which an appropriate content of such a substance has been imparted or by means of a dough during the production of which from normal flour there has been added an appropriate quantity of a substance having the properties in question which has been intermixed intimately with the other constituents of the dough.

The substance that I have found capable of improving the baking strength of flour similarly to the oxydants previously used for this purpose and constituting at the same time a "normal physiological constituent of food" is ascorbic acid, $C_6H_8O_6$, in place of which, however, substances that contain ascorbic acid but no substances the addition of which to flour or dough or the presence of which in flour or dough or bread in the quantities in question will be injurious to said materials, may be used.

The ascorbic acid which forms now a product of regular commerce, manufactured on a considerable scale, has been demonstrated by the investigations of Szent-Györgyi, Tilmans and King to be identical with the vitamin C (the antiscorbutic vitamin) and consequently it can safely be held a "normal physiological constituent of food". By imparting a suitable content of ascorbic acid to flour or dough and baking said flour or dough to loaves under normalized conditions, the loaves will prove being of a greater volume than loaves made from the same flour or dough to which no content of ascorbic acid has been imparted provided of course that no other means for improving the baking strength have been used in this case.

With these general statements of the objects and purposes of my invention I will now proceed to describe the embodiment thereof and the manner in which my invention is carried out, and it will be understood that while I have described what may be considered certain preferable manners of carrying my invention out I do not limit myself to the precise conditions or proportions herein set forth as they may be varied by those skilled in the art in accordance with the particular purposes for which they are intended and the conditions under which they are to be utilized.

Example 1

0.2 gram (200 mgrs.) of ascorbic acid are intimately mixed with 50 grams of wheat flour in a small container. After mixing, the said 50 grams of flour are brought with their content of ascorbic acid into a mixing drum of the usual design or another mixing apparatus in which 100 kgs. of wheat flour are contained. The mixing drum is started and in a few minutes the whole quantity of flour is thoroughly mixed. After this the flour may at once be employed for baking purposes.

The described two-step method of mixing the comparatively small amount of ascorbic acid into the comparatively great amount of flour is to be preferred for a method according to which the small amount of ascorbic acid is directly added to the total quantity of flour, because the production of a homogeneous mixture is thereby greatly facilitated. The quantity of flour to which the ascorbic acid is added in the first instance is thereby without any importance except for the facility with which this preliminate mixing can be carried out by means of any apparatus occasionally at disposal. In place of the two-step operation described a three-step or multi-step operation may be used.

The ratio of 0.2 gram of ascorbic acid to 100 kgs. of wheat flour is not important as the amount of ascorbic acid to be used with a certain quantity of flour may vary considerably. Generally speaking, however, the amount of ascorbic acid required for obtaining a considerable improvement in baking strength will be extremely small. Thus 0.02 gram of ascorbic acid to 100 kgs. of wheat flour will produce an ascertainable improvement in baking strength of most wheat flours and the use of such a small ratio of ascorbic acid to flour is therefore within the scope of my invention. By increasing the ratio of ascorbic acid to flour, the influence on the baking strength will increase. The amount of ascorbic acid that can be used with a certain quantity of flour is limited in the practical use of my invention by the fact that ascorbic acid is a rather expensive substance as compared with the flour the baking strength of which it is desired to improve. Experiments have proved, however, that increasing the ratio of ascorbic acid to flour from the ratio of 0.2 gram : 100 kgs. mentioned above to at least 5 grams : 100 kgs. may result in a further increase of the baking strength.

In a concrete experiment, by employing the flour produced in the manner described above for baking, the ratio of ascorbic acid to flour being 0.2 gram : 100 kgs., large fine loaves were obtained having an average volume of abt. 2700 cc. (weight of the loaf 700 grams) whereas, loaves, produced for comparison in exactly the same manner using the same flour without addition of ascorbic acid made an average volume of abt. 2400 cc. (weight of the loaf 700 grams as before). Thus the addition of ascorbic acid has involved an increase in the volume of the loaves of abt. 300 cc. or 12.5 pct.

Example 2

In a great kneading machine 250 kgs. of flour are contained; when no ascorbic acid is employed, 135 litres of water in which salt, yeast, extract of malt and other constituents of dough are previously dissolved or suspended must be used for this quantity of flour. If ascorbic acid is to be used one litre or another suitable quantity is simply removed from the said 135 litres before they are added to the flour. In this litre of water or other quantity a quantity of 0.6 gram (600 mgrs.) of ascorbic acid or another quantity of this substance which it is desired to use with the 250 kgs. of flour is then dissolved after which the resulting solution is added to the flour in the kneading machine together with the other 134 litres of water or other remaining quantity thereof.

In place of dissolving the ascorbic acid in the water to be added to the flour to form a dough as described in Example 2 it may be mixed with one of the other constituents of the dough for instance the extract of malt, the yeast etc. or it may be brought into the dough in some other manner.

The remarks that have been put forward in relation to Example 1 as to the ratio of ascorbic acid to flour apply also to the amount of ascorbic acid used according to Example 2.

In case a substance containing ascorbic acid is used in place of ascorbic acid itself the amount of such substance must of course be increased to account for the decrease in the proportion of ascorbic acid contained therein.

Example 3

The invention may be carried out by employing ascorbic acid directly in the condition in which it occurs in nature for instance in constituents of vegetables rich in ascorbic acid (lemon, oranges, grapefruits, hips, etc.). In a preferred form this manner of carrying the invention into effect can be carried out as follows by using lemon-juice for the ascorbic acid-containing material.

The requisite amount of lemon-juice is produced by pressing lemons in the well-known manner. The juice is preferably neutralized by an alkali for instance by sodium hydroxide. The flour the baking strength of which it is desired to improve is produced on the mill with a content of water somewhat smaller than the usual one, for instance with the water-content of 14 pct. in place of the usual 15 pct. The flour is then sprinkled or sprayed with the lemon-juice by means of atomizers or sprinklers or the like of the well-known kind so that about 1 litre of lemon-juice is applied to each 100 kgrs. of flour. The flour being produced with a water content somewhat smaller than the usual one, it attains normal water content by the said treatment. The flour may at once be used for baking purposes. In a certain experiment that has been carried out, a loaf, produced from wheat flour treated with lemon-juice in the manner described obtained a volume of about 2750 cc. (weight of the loaf 700 grams). A loaf produced for comparison in an identical manner from a flour of identical quality which has not been treated with lemon-juice, obtained a volume of only about 2475 cc.; the power of the ascorbic acid added with the lemon-juice to improve the baking strength clearly reveals itself in this result.

In all cases occurring in actual practice the amount of lemon-juice, neutralized or not, required for obtaining the purpose of the invention will be less than about 5 litres per 100 kgs. flour and thus this addition is insignificant with respect to the taste of the bread. Besides, instead of using juice of lemons or other orange-like fruits I may use fruits or fruit-products or products of other kinds rich in ascorbic acid and having no taste or a less prominent one which is for instance the case with hips.

A question of interest—although it is not directly of importance with respect to the practicability of the invention—is the question of how to explain the reason why ascorbic acid produces an improving effect on the baking strength of flour. Several hypothetical explanations present themselves; possibly the effectiveness of the ascorbic acid is due to the fact that it is a reducing agent capable of absorbing the oxygen of the atmosphere. Possibly the ascorbic acid thus oxidized is capable of delivering the oxygen absorbed to the proteolytic enzymes of the flour which are detrimental to the baking strength and thus make said enzymes inactive.

What I claim is:

1. A method of improving the baking strength of dough comprising the step of imparting to the dough from 0.2 gram to 5 grams of a substance selected from the group consisting of ascorbic acid and the alkali salts thereof per 100 kilograms of the flour used in producing the dough.

2. A method of improving the baking strength of dough comprising the step of imparting to the dough from 0.2 gram to 5 grams of ascorbic acid per 100 kilograms of the flour used in producing the dough.

3. An improved flour consisting of from 0.2 gram to 5 grams of a substance selected from the group consisting of ascorbic acid and the alkali salts thereof per 100 kilograms of flour.

4. An improved flour consisting of from 0.2 gram to 5 grams of ascorbic acid per 100 kilograms.

HOLGER JØRGENSEN.